(12) United States Patent
Shieh et al.

(10) Patent No.: US 10,397,653 B2
(45) Date of Patent: Aug. 27, 2019

(54) CONTENT CONTROL SYSTEM WITH FILTERING MECHANISM AND METHOD OF OPERATION THEREOF

(71) Applicant: Samsung Electronics Co., Ltd., Gyeonggi-Do (KR)

(72) Inventors: Eddie Shieh, Oakland, CA (US); Carina Ngai, Millbrae, CA (US); Rose Figliano, San Francisco, CA (US); Tom Brinck, Palo Alto, CA (US); William Aylesworth, Santa Clara, CA (US); Suzanne Currie, Mountain View, CA (US); James M. A. Begole, Los Altos, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 211 days.

(21) Appl. No.: 14/045,917

(22) Filed: Oct. 4, 2013

(65) Prior Publication Data

US 2015/0100977 A1    Apr. 9, 2015

(51) Int. Cl.
| | |
|---|---|
| *H04N 21/488* | (2011.01) |
| *H04N 21/45* | (2011.01) |
| *H04N 21/4402* | (2011.01) |
| *H04N 21/2347* | (2011.01) |
| *H04N 21/258* | (2011.01) |
| *H04N 21/418* | (2011.01) |
| *H04N 21/431* | (2011.01) |
| *H04N 21/454* | (2011.01) |
| *H04N 21/472* | (2011.01) |
| *H04N 21/44* | (2011.01) |
| *H04N 21/475* | (2011.01) |

(52) U.S. Cl.
CPC ... *H04N 21/4542* (2013.01); *H04N 21/44008* (2013.01); *H04N 21/44016* (2013.01); *H04N 21/4532* (2013.01); *H04N 21/4751* (2013.01); *H04N 21/47217* (2013.01)

(58) Field of Classification Search
None
See application file for complete search history.

(56) References Cited

U.S. PATENT DOCUMENTS

| | | | |
|---|---|---|---|
| 6,226,793 B1 * | 5/2001 | Kwoh | H04H 60/12 348/E5.105 |
| 2002/0124182 A1 | 9/2002 | Basco et al. | |
| 2003/0192044 A1 | 10/2003 | Huntsman | |
| 2005/0081043 A1 | 4/2005 | Evans et al. | |
| 2005/0091498 A1 * | 4/2005 | Williams | G11B 20/00086 713/176 |

(Continued)

FOREIGN PATENT DOCUMENTS

WO    2013138743 A1    9/2013

*Primary Examiner* — Brian T Pendleton
*Assistant Examiner* — Jean D Saint Cyr
(74) *Attorney, Agent, or Firm* — Perspectives Law Group, Corp.

(57) ABSTRACT

A content control system includes: a pattern module configured to determine a filter pattern on a display content; a decision module, coupled to the pattern module, configured to generate an alteration decision based on the filter pattern failing to meet a community standard; and a replacement module, coupled to the decision module, configured to generate a replacement content based on the alteration decision for displaying on a device.

20 Claims, 7 Drawing Sheets

(56) References Cited

U.S. PATENT DOCUMENTS

| | | | |
|---|---|---|---|
| 2005/0188423 A1* | 8/2005 | Motsinger | H04L 63/0876 |
| | | | 726/22 |
| 2006/0095976 A1 | 5/2006 | Torres et al. | |
| 2006/0130118 A1 | 6/2006 | Damm | |
| 2009/0115776 A1 | 5/2009 | Bimbra et al. | |
| 2009/0150444 A1* | 6/2009 | Cohen | G06Q 20/1235 |
| 2009/0295993 A1 | 12/2009 | Chhokra | |
| 2009/0316951 A1 | 12/2009 | Soderstrom | |
| 2011/0047388 A1* | 2/2011 | Park | G06F 21/6209 |
| | | | 713/189 |
| 2012/0136965 A1* | 5/2012 | Matz | H04N 7/163 |
| | | | 709/217 |
| 2012/0159530 A1 | 6/2012 | Ahrens et al. | |
| 2012/0173722 A1* | 7/2012 | Chen | H04L 12/1895 |
| | | | 709/224 |
| 2012/0251074 A1* | 10/2012 | Bhogal et al. | 386/239 |
| 2013/0046773 A1 | 2/2013 | Kannan et al. | |
| 2013/0191403 A1 | 7/2013 | Seryakov et al. | |
| 2015/0003811 A1* | 1/2015 | Kandekar | H04N 21/4325 |
| | | | 386/261 |

\* cited by examiner

CONTENT CONTROL SYSTEM WITH FILTERING MECHANISM AND METHOD OF OPERATION THEREOF

TECHNICAL FIELD

An embodiment of the present invention relates generally to a content control system, and more particularly to a system for filtering mechanism.

BACKGROUND

Modern portable consumer and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Thus, a need still remains for a content control system with filtering mechanism for aiding the consumption of information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a content control system including: a pattern module configured to determine a filter pattern on a display content; a decision module, coupled to the pattern module, configured to generate an alteration decision based on the filter pattern failing to meet a community standard; and a replacement module, coupled to the decision module, configured to generate a replacement content based on the alteration decision for displaying on a device.

An embodiment of the present invention provides a method of operation of a content control system including: determining a filter pattern on a display content; generating an alteration decision based on the filter pattern failing to meet a community standard; and generating a replacement content with a control unit based on the alteration decision for displaying on a device.

An embodiment of the present invention provides a non-transitory computer readable medium including: determining a filter type of a filter indicator; determining a filter pattern of the filter type on a display content; generating an alteration decision based on the filter pattern failing to meet a community standard; and generating a replacement content with a control unit based on the alteration decision for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
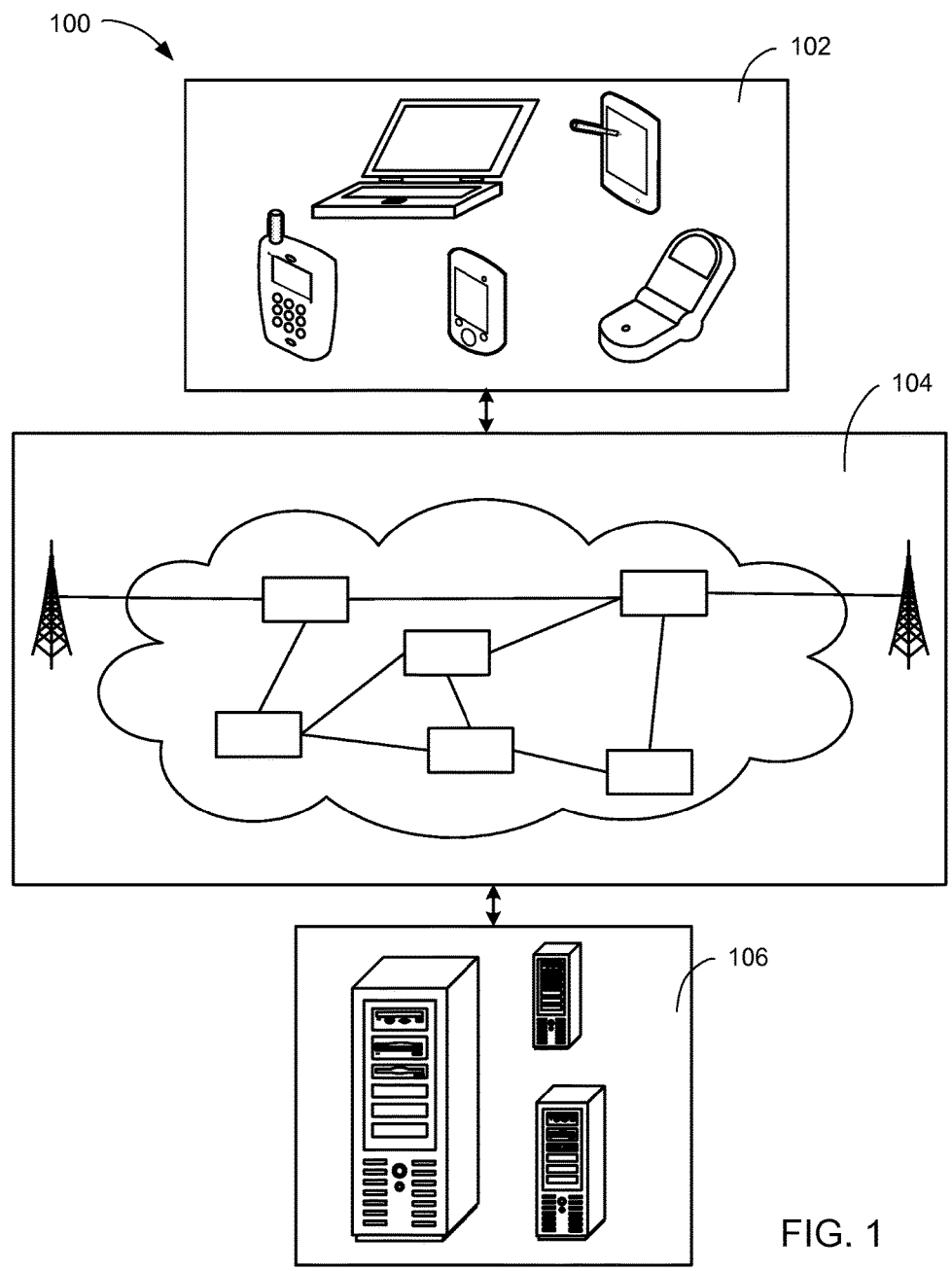
FIG. 1 is a content control system with filtering mechanism in an embodiment of the present invention.

The following embodiments of the present invention provide a replacement content for a display content having substance unsuitable for a viewer. A filter indicator can be provided by an individual, a community, or a combination thereof to indicate that the display content can represent an objected content. A safe zone notification can be provided to a viewer to forewarn a flag type present in the display content. The replacement content can be rated by a content rating to improve the quality of a filter pattern of the filter indicator for generating the replacement content.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content control system 100 with filtering mechanism in an embodiment of the present invention. The content control system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a stand-alone device, or can be incorporated with a vehicle, for example a car, truck, bus, aircraft, boat/vessel, or train. The first device 102 can couple to the communication path 104 to communicate with the second device 106.

For illustrative purposes, the content control system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the content control system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the content control system 100 is shown with the second device 106 and the first device 102 as end points of the communication path 104, although it is understood that the content control system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
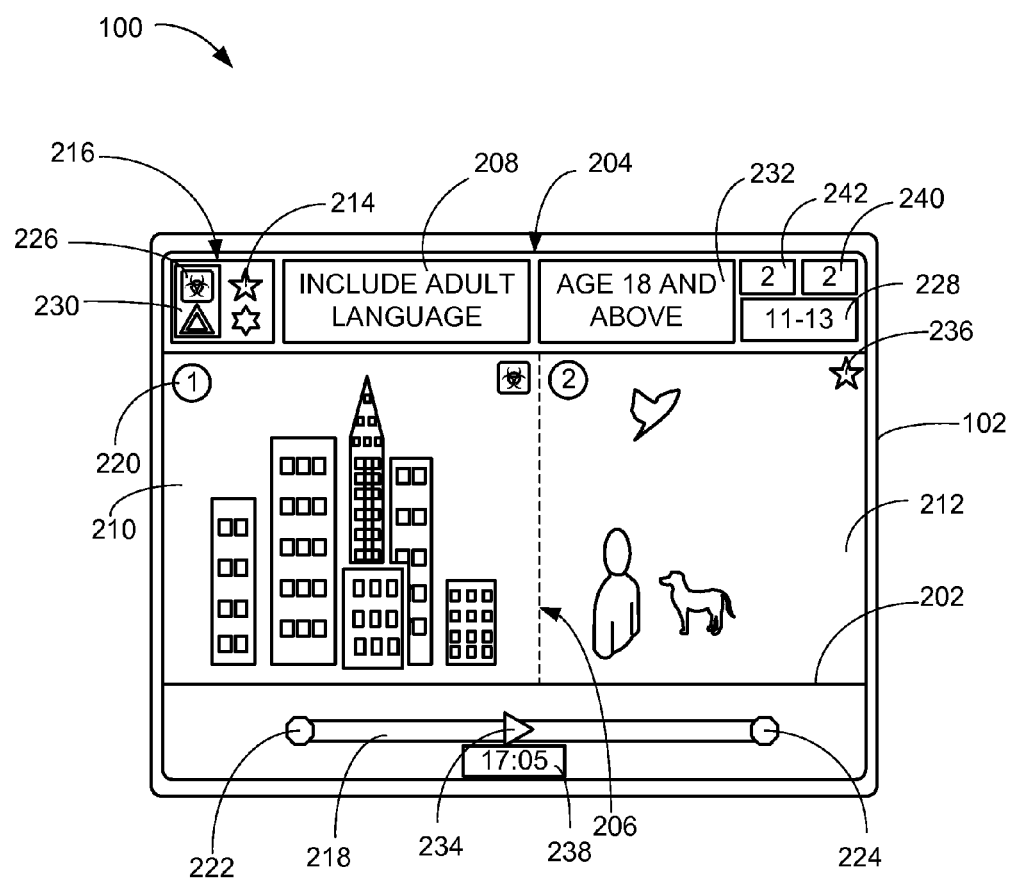
FIG. 2 is an example of a display content displayed on a display interface of the first device.

Referring now to FIG. 2, therein is shown example of a display content 202 displayed on a display interface 204 of the first device 102. For clarity and brevity, the discussion of the present invention will focus on the first device 102 displaying the result generated by the content control system 100. However, the second device 106 of FIG. 1 and the first device 102 can be discussed interchangeably.

A content section 206 is a portion of the display content 202. For example, the content section 206 can represent scene 5 of the movie stored within a digital versatile disc (DVD). A content type 208 is a categorization of the display content 202. For example, the content type 208 can include an objected content 210, a non-objected content 212, or a combination thereof. The objected content 210 can represent the display content 202, the content section 206, or a combination thereof having a filter indicator 214. The non-objected content 212 can represent the display content 202, the content section 206, or a combination thereof without the filter indicator 214.

The filter indicator 214 is a mark placed on the display content 202 to raise awareness of the substance of the display content 202. A filter type 216 is a categorization of the filter indicator 214. The filter type 216 can include a sequence indicator 218, which is the filter indicator 214 to indicate an indicator relationship 220 representing an ordered relationship. For example, the indicator relationship 220 can represent a sequence of an order, such as a content start 222 and a content end 224 of the display content 202. More specifically, the content start 222 can represent the beginning of the display content 202, the content section 206, or a combination thereof. The content end 224 can represent the end of the display content 202, the content section 206, or a combination thereof.

The filter type 216 can include a flag indicator 226, which is the filter indicator 214 to indicate the display content 202 having substance unsuitable for an age group 228. A flag type 230 is a categorization of the flag indicator 226. For example, the flag indicator 226 can indicate that the display content 202 having the flag type 230 of adult content, such as sexual content, obscenity, violence, or a combination thereof. The age group 228 is a classification of age range.

For example, the age group 228 can represent 3 to 5 year olds, 6 to 10 year olds, 11-13 year olds, 14-18 year olds, or a combination thereof.

A content rating 232 is an assessment of the display content 202. For example, a user entry 234 representing the content rating 232 can be made by the user of the content control system 100 to indicate the necessity of the flag indicator 226 for the content section 206. More specifically, the content rating 232 can represent "child safe," "teenager safe," "adults only," or a combination thereof to classify the display content 202.

A filter pattern 236 is an arrangement of the filter indicator 214 on the display content 202. For example, the filter pattern 236 can represent the arrangement of the filter indicator 214 on the display content 202, the content section 206, or a combination thereof. A content time 238 is a time reference of the display content 202. For example, the content time 238 can represent "16:59" of 60 minute video. The filter pattern 236 can indicate that the filter indicator 214 can be marked at the content time 238 of "17:05" of the display content 202.

An indicator count 240 is a tally of the filter indicator 214. For example, the indicator count 240 can represent the tally of the filter indicator 214 marked on the display content 202, the content section 206, or a combination thereof. A count threshold 242 is minimum number of the indicator count 240.

Figure 3:
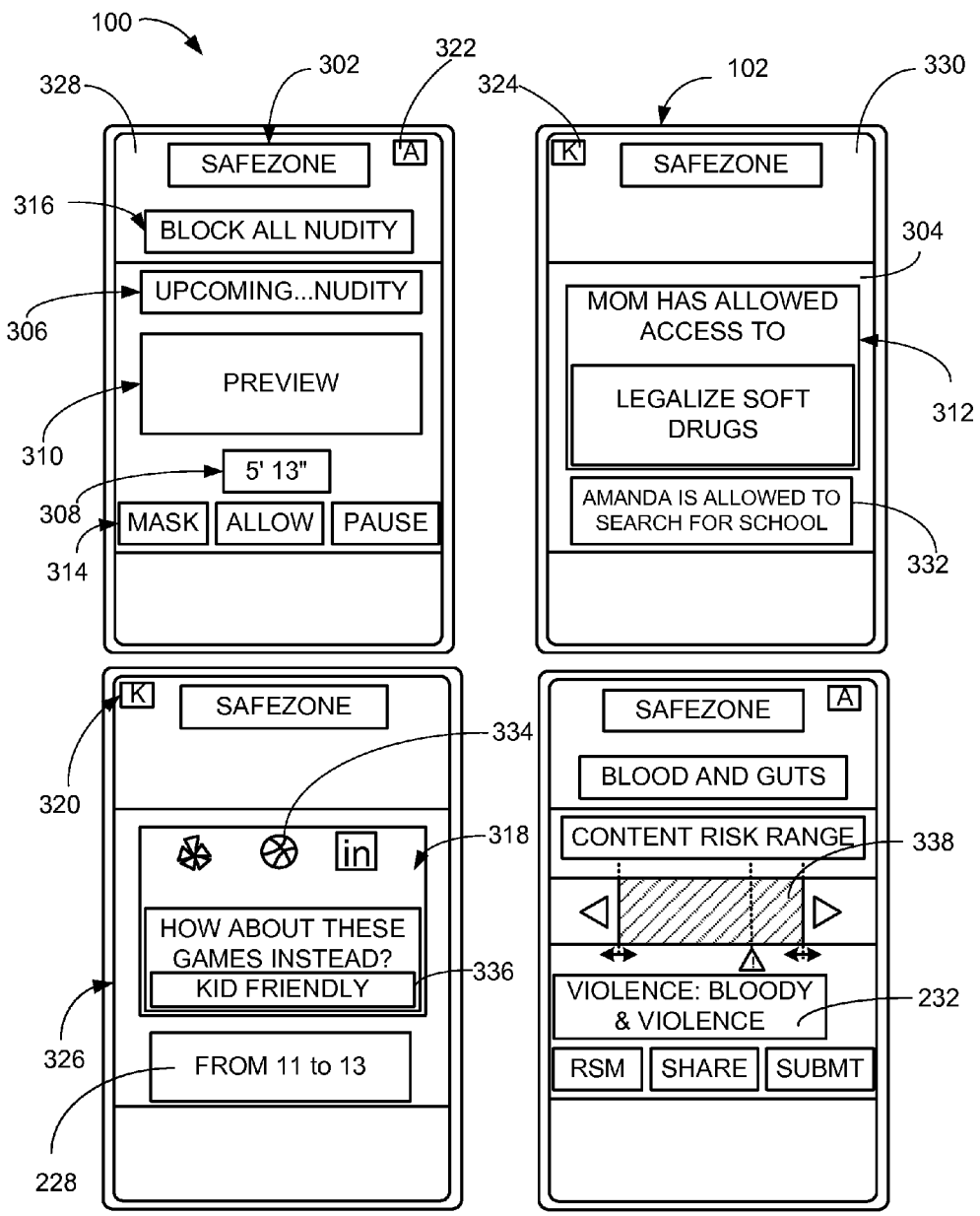
FIG. 3 is examples of a notification type.

Referring now to FIG. 3, therein is shown examples of a notification type 302. The content control system 100 can display a variety of the notification type 302 to forewarn the substance of the display content 202 of FIG. 2. The notification type 302 is a categorization of a safe zone notification 304. The safe zone notification 304 is a warning regarding the substance of the display content 202. For example, the safe zone notification 304 can represent the warning to indicate that the content section 206 of FIG. 2 with the flag type 230 of FIG. 2 of nudity is coming up at the content time 238 of FIG. 2. The safe zone notification 304 can include an obscenity alert 306, which is a warning that the display content 202 has the flag type 230 of adult content. The obscenity alert 306 can have a countdown time 308, a content preview 310, or a combination thereof. The countdown time 308 indicates the time left before reaching the content time 238 where the flag type 230 unsuitable for the age group 228 will be displayed. The content preview 310 is a snippet of the display content 202. For example, the content preview 310 can disclose the first 5 seconds of the objected content 210 of FIG. 2.

The safe zone notification 304 can include a permission notice 312, which is a choice to view the display content 202 or not displayed on the display interface 204 of FIG. 2. The permission notice 312 can include a filter option 314, which is a choice to decide a filter level 316. The filter level 316 is the amount of filtering the display content 202. For example, the filter level 316 can represent block all adult content. For another example, the filter level 316 can represent block only strong language. The safe zone notification 304 can include a content suggestion 318, which is a recommendation of the display content 202 appropriate for the age group 228.

The safe zone notification 304 can include a risk range 338. The risk range 338 is duration of the objected content 210 of FIG. 2. For example, the risk range 338 can include the content start 222 of FIG. 2 to signify the beginning of the risk range and the content end 224 of FIG. 2 to signify the end of the risk range 338. The content rating 232 can classify the risk range 338. More specifically, the content rating 232 of the risk range 338 can represent "bloody violence."

The content control system 100 can display the display content 202 on the first device 102 according to a mode type 320, which is the categorization of a view mode displayed on the display interface 204 of FIG. 2. The mode type 320 can include an adult mode 322, a kid mode 324, or a combination thereof. The adult mode 322 is the mode type 320 where the display content 202 is displayed without filtration. The kid mode 324 is the mode type 320 where the display content 202 is displayed based on the filter level 316. For example, the content control system 100 with the kid mode 324 can display the display content 202 appropriate for the age group 228.

A view type 326 is a categorization of a display view. For example, the view type 326 can include a parent view 328, a child view 330, or a combination thereof. The parent view 328 is the view type 326 where permission to access the display content 202 is unlimited. The child view 330 is the view type 326 where permission to access the display content 202 is limited. For example, under the kid mode 324, the child view 330 can only display the non-objected content 212 and cannot display the objected content 210. In contrast, under the kid mode 324, the parent view 328 can displaying the configuration setting to control what is displayable on the child view 330.

A joint agreement 332 is an arrangement between multiple users of the content control system 100 for accessing the display content 202. For example, the joint agreement 332 can represent the content type 208 of FIG. 2 viewable by a non-adult user agreed between a parent and a child. The non-adult users can represent an individual younger than the age specified by the government as an adult age, such as 18 in the United States. The adult user can represent an individual older than the age specified by the government as an adult age.

The content control system 100 can decide whether to generate a replacement content 334 based on the indicator count 240 of FIG. 2 compared to the count threshold 242 of FIG. 2. The replacement content 334 is filtered version of the display content 202. For example, the replacement content 334 can have the content section 206 blocked, masked, blurred, occluded, or a combination thereof where the flag indicator 226 of FIG. 2 was marked. A replacement rating 336 is an assessment of the replacement content 334. For example, the replacement rating 336 can represent whether the replacement content 334 blocked the content section 206 with the flag type 230 of nudity according to the filter level 316.

Figure 4:
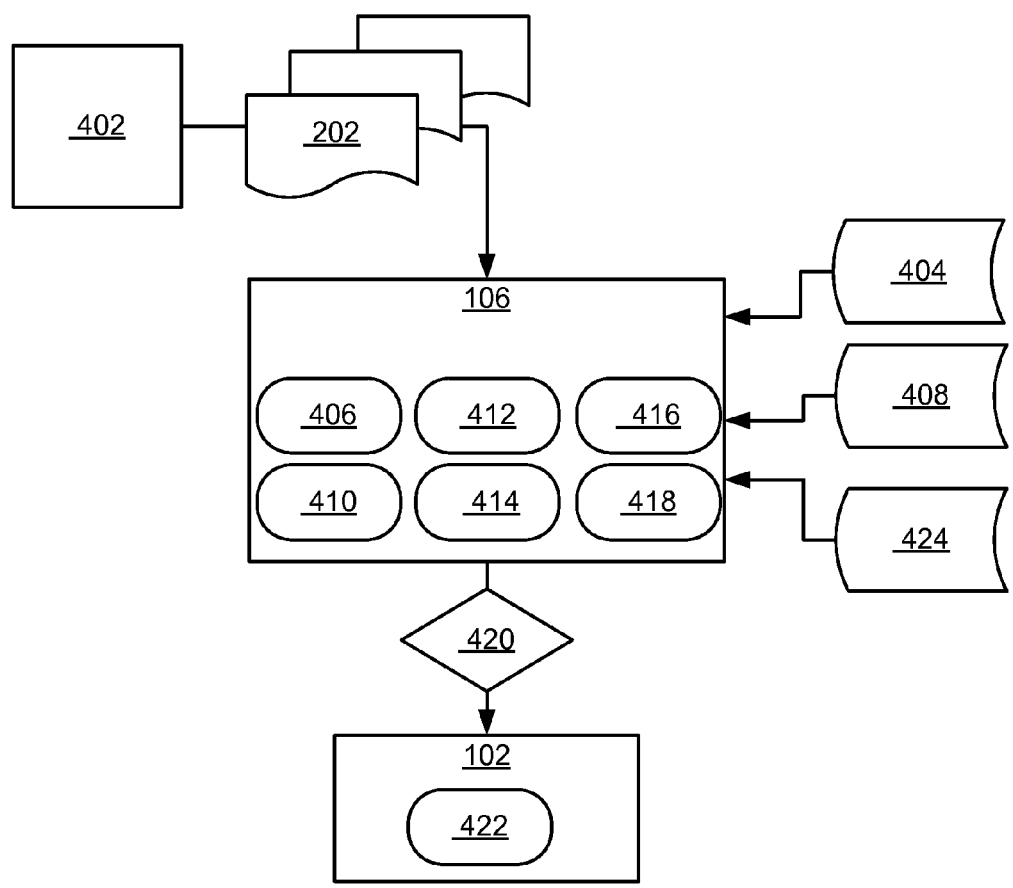
FIG. 4 is an example of system architecture of the content control system.

Referring now to FIG. 4, therein is shown an example of system architecture of the content control system 100. A content source 402 can provide the display content 202 to the second device 106 of the content control system 100. For example, the content source 402 can represent an individual, an entity, or a combination thereof. A filter source 404 can provide the filter indicator 214 of FIG. 2 to the content control system 100. For example, the filter source 404 can represent an individual, an entity, or a combination thereof. A user 424 can represent an instance of the filter source 404 who is an individual. The user 424 can represent an adult user or a non-adult user.

A community profile 406 is a description of the filter source 404 representing a community 408. For example, the community 408 can represent an entity, group of users, a group of entities, or a combination thereof promoting filtration of the display content 202. The community profile 406 can include information, such as the website address, the contact information, or a combination thereof. An individual profile 410 is a description of a user, another user, or a combination thereof of the content control system 100. An activity record 412 is an evidence of accessing the content control system 100. For example, the activity record 412 can represent the evidence of providing the filter indicator 214 for particular instance of the content type 208 of FIG. 2.

A community model 414 is an exemplary instance of the filter pattern 236 of FIG. 2. For example, the community model 414 can represent the filter pattern 236 meeting a community standard 416. The community standard 416 can represent the filter pattern 236 approved by the community 408. A difference threshold 418 can represent the minimum difference between filter pattern 236 provided by an individual and the community model 414.

An alteration decision 420 is a result from comparing an instance of the filter pattern 236 with another instance of the filter pattern 236. For example, the alteration decision 420 can represent the result from comparing the indicator count 240 of FIG. 2 to the count threshold 242 of FIG. 2. For another example, the alteration decision 420 can represent the result from comparing the filter pattern 236 marked by the user of the content control system 100 and the filter pattern 236 of the community standard 416. An access report 422 is a summary of the display content 202 accessed by the user of the content control system 100. The access report 422 can be displayed on the first device 102.

Figure 5:
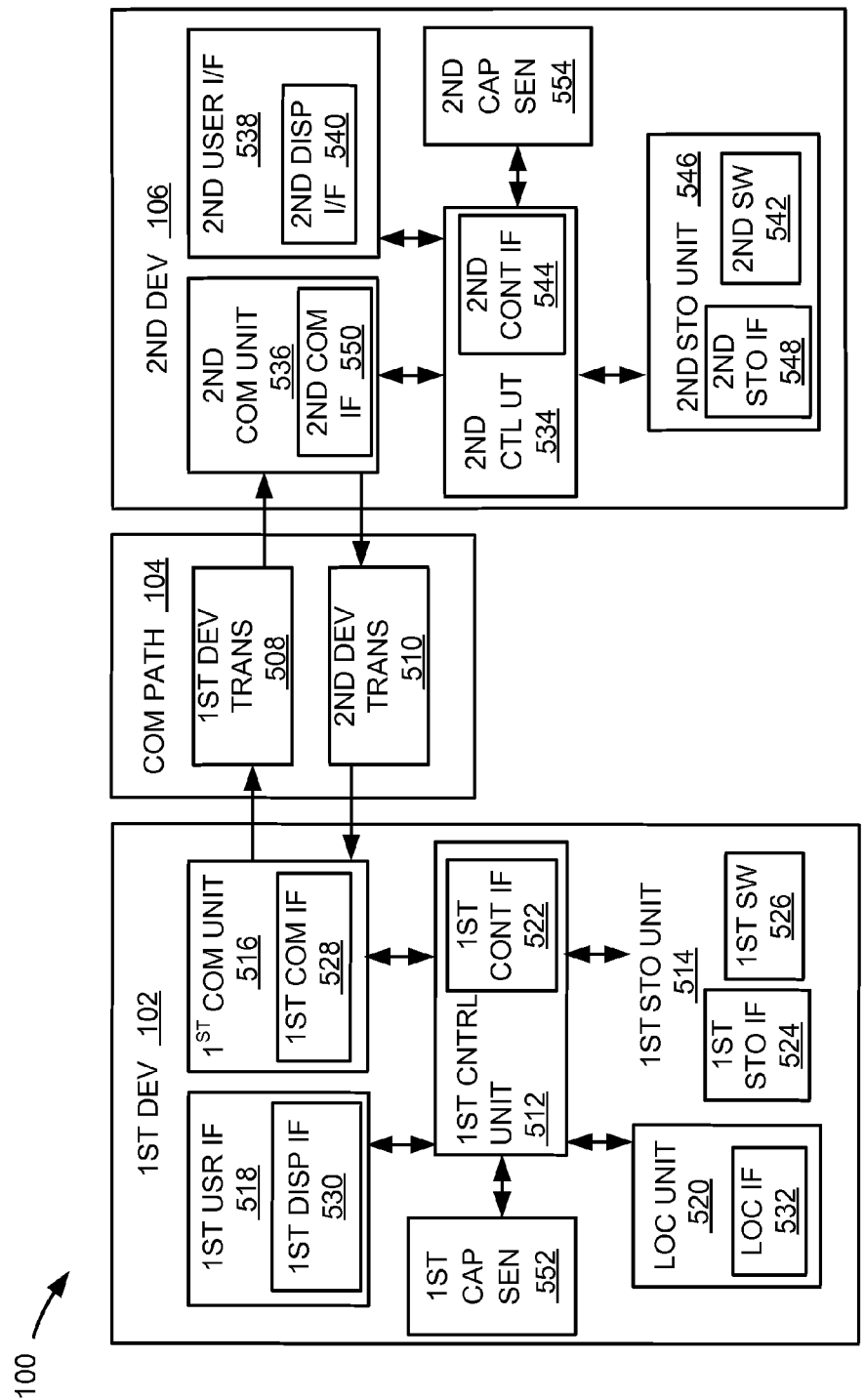
FIG. 5 is an exemplary block diagram of the content control system.

Referring now to FIG. 5, therein is shown an exemplary block diagram of the content control system 100. The content control system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the content control system 100 is shown with the first device 102 as a client device, although it is understood that the content control system 100 can have the first device 102 as a different type of device. For example, the first device 102 can be a server having a display interface.

Also for illustrative purposes, the content control system 100 is shown with the second device 106 as a server, although it is understood that the content control system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the content control system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof. The relevant information can also include news, media, events, or a combination thereof from the third party content provider.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the content control system 100. The first control unit 512 can also execute the first software 526 for the other functions of the content control system 100, including receiving location information from the location unit 520. The first control unit 512 can further execute the first software 526 for interaction with the communication path 104 via the first communication unit 516.

The second device 106 can be optimized for implementing the embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the content control system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the content control system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the content control system 100 is shown with the second storage unit 546 as a single hierarchy storage system, although it is understood that the content control system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The content control system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the content control system 100 is described by operation of the first device 102 and the second device 106. It is understood that the first device 102 and the second device 106 can operate any of the modules and functions of the content control system 100. For example, the first device 102 is described to operate the location unit 520, although it is understood that the second device 102 can also operate the location unit 520.

Figure 6:
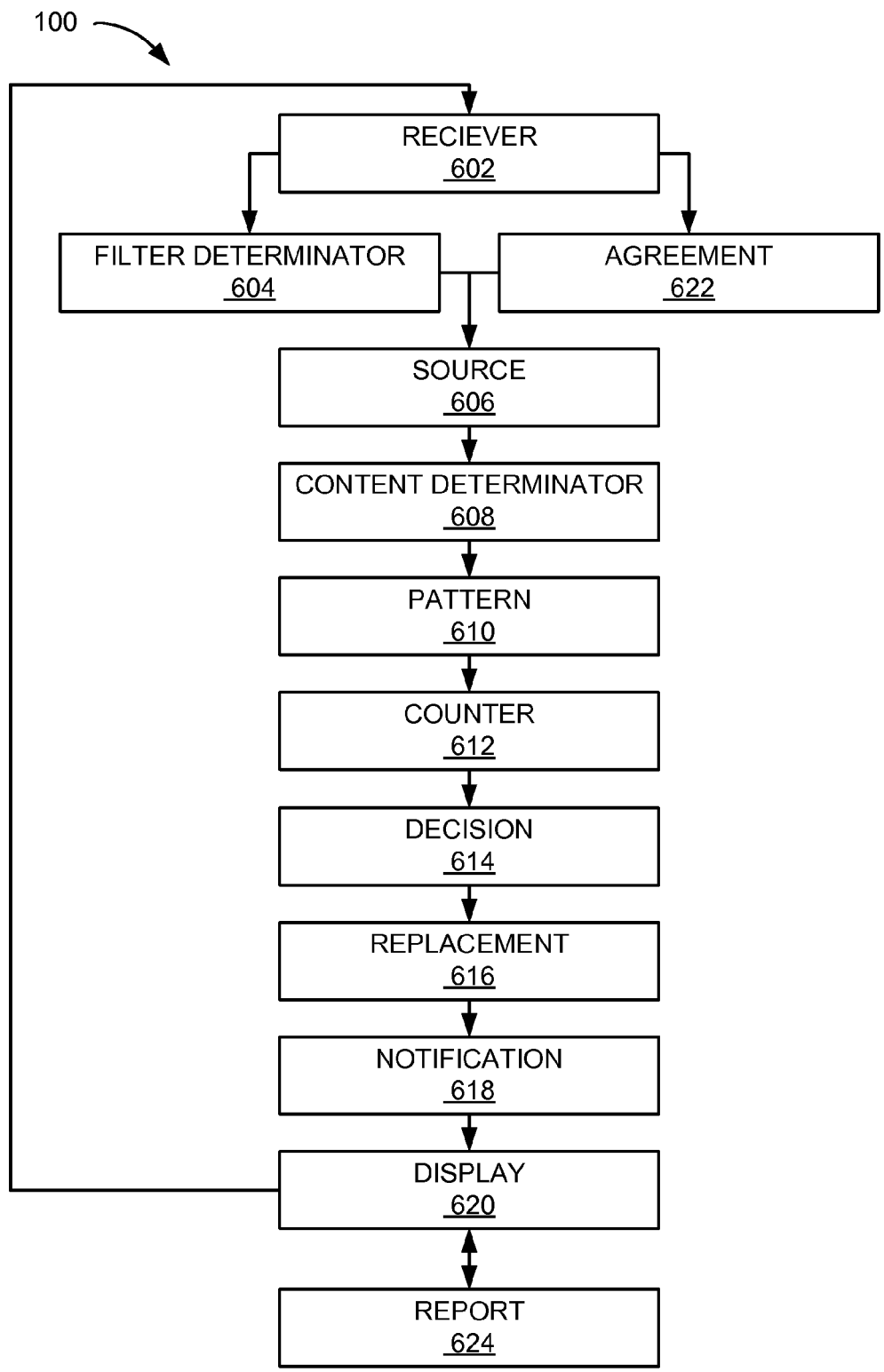
FIG. 6 is a control flow of the content control system.

Referring now to FIG. 6, therein is shown a control flow of the content control system 100. The content control system 100 can include a receiver module 602. The receiver module 602 receives the filter indicator 214 of FIG. 2. The receiver module 602 can receive the filter indicator 214 in a number of ways. For example, the receiver module 602 can receive the user entry 234 of FIG. 2 for the filter indicator 214 for marking the display content 202 stored in the first storage unit 514 of FIG. 5. For a different example, the receiver module 602 can receive the display content 202 without the filter indicator 214 from the content source 402 of FIG. 4. The receiver module 602 can send the filter indicator 214, the display content 202, or a combination thereof to a filter determinator module 604.

The content control system 100 can include the filter determinator module 604, which can couple to the receiver module 602. The filter determinator module 604 can determine the filter type 216 of FIG. 2. For example, the filter determinator module 604 can determine the filter type 216 of the filter indicator 214.

The filter determinator module 604 can determine the filter type 216 in a number of ways. For example, the filter determinator module 604 can determine the filter type 216 representing the sequence indicator 218 of FIG. 2. More specifically, the filter determinator module 604 can determine the sequence indicator 218 based on the indicator relationship 220 of FIG. 2 as an ordered pair by identifying one instance of the sequence indicator 218 placed subsequent to another instance of the sequence indicator 218.

For another example, the filter determinator module 604 can determine the filter type 216 representing the flag indicator 226 of FIG. 2. More specifically, the filter determinator module 604 can determine the flag indicator 226 by the user of the content control system 100 providing the content rating 232 of FIG. 2 indicating that the content section 206 of FIG. 2 of the display content 202 has substance unsuitable for non-adult users. The filter determinator module 604 can send the filter type 216 to a source module 606.

The content control system 100 can include the source module 606, which can couple to the filter determinator module 604. The source module 606 identifies the filter source 404 of FIG. 4. For example, the source module 606 can identify the filter source 404 of the filter indicator 214.

The source module 606 can identify the filter source 404 in a number of ways. For example, the source module 606 can identify the filter source 404 based on the community profile 406 of FIG. 4, the individual profile 410 of FIG. 4, the activity record 412 of FIG. 4, or a combination thereof. For a specific example, the source module 606 can identify the filter source 404 based on the internet protocol (IP) address from where the provider had sent the filter indicator 214.

More specifically, the source module 606 can identify the filter source 404 based on the activity record 412 for the community profile 406, the individual profile 410, or a combination thereof. The provider can provide the community profile 406, the individual profile 410, or a combination thereof along with providing the filter indicator 214. The community profile 406, the individual profile 410, or a combination thereof can disclose that the entity or an individual can be a member of the social network site. Further, the community profile 406, the individual profile 410, or a combination thereof can disclose the political view of the provider. The activity record 412 can indicate the content type 208 of FIG. 2 marked with the filter indicator 214 by the provider with the community profile 406, the individual profile 410, or a combination thereof. As a result, the source module 606 can identify the filter source 404 providing the filter indicator 214. The source module 606 can send the filter source 404 to a content determinator module 608.

The content control system 100 can include the content determinator module 608. The content determinator module 608 determines the content type 208. For example, the content determinator module 608 can determine the content type 208 of the display content 202 as the objected content 210 of FIG. 2 or the non-objected content 212 of FIG. 2.

The content determinator module 608 can determine the content type 208 in a number of ways. For example, the content determinator module 608 can determine the content type 208 of the objected content 210 based on the filter type 216. More specifically, the content determinator module 608 can determine the display content 202 as the objected content 210 if the display content 202 is marked with the filter type 216 of the flag indicator 226. In contrast, the content determinator module 608 can determine the content type 208 as the non-objected content 212 if the display content 202 is without the flag indicator 226. The content determinator module 608 can send the content type 208 to a pattern module 610.

The content control system 100 can include the pattern module 610, which can couple to the content determinator module 608. The pattern module 610 determines the filter pattern 236 of FIG. 2. For example, the pattern module 610 can determine the filter pattern 236 based on the filter indicator 214 marked on the display content 202.

The pattern module 610 can determine the filter pattern 236 in a number of ways. For example, the pattern module 610 can determine the content start 222 of FIG. 2, the content end 224 FIG. 2, or a combination thereof based on the filter type 216 of the filter indicator 214. More specifically, the pattern module 610 can determine the content start 222 of the objected content 210 by identifying the indicator relationship 220 of the sequence indicator 218 marked on the display content 202.

For another example, the pattern module 610 can determine the filter pattern 236 for the display content 202 based on the content section 206 marked with the filter indicator 214. More specifically, the pattern module 610 can determine the filter pattern 236 based on the content time 238 of FIG. 2 of the content section 206 to indicate when and where the filter indicator 214 is provided on the display content 202.

For another example, the pattern module 610 can determine the filter pattern 236 for the community 408 of FIG. 4 based on the activity record 412 for the community profile 406. More specifically, the pattern module 610 can determine the filter pattern 236 by identifying the content section 206 having the filter indicator 214 which was provided by the community 408. Furthermore, the pattern module 610 can determine the filter pattern 236 for when and where certain instance of the filter type 216 is provided by the community 408 based on identifying the filter indicator 214 marked on the content section 206. For a different example, the pattern module 610 can determine the filter pattern 236 for each user of the content control system 100 similarly as the filter pattern 236 for the community 408. As discussed above, the pattern module 610 can determine the filter pattern 236 by identifying the content section 206 having the filter indicator 214 provided by the user of the content control system 100. The pattern module 610 can send the filter pattern 236 to a counter module 612.

The content control system 100 can include the counter module 612, which can couple to the pattern module 610. The counter module 612 calculates the indicator count 240 of FIG. 2. For example, the counter module 612 can calculate the indicator count 240 based on counting the filter indicator 214 marked on the display content 202. Moreover, the counter module 612 can calculate the indicator count 240 for the filter pattern 236 by counting the indicator count 240 for each instances of the filter type 216 marked within the content section 206 or the display content 202 as a whole. The counter module 612 can send the indicator count 240 to a decision module 614.

The content control system 100 can include the decision module 614, which can couple to the counter module 612. The decision module 614 generates the alteration decision 420 of FIG. 4. For example, the decision module 614 can generate the alteration decision 420 based on the indicator count 240 meeting or exceeding the count threshold 242 of FIG. 2.

For a specific example, the decision module 614 can generate the alteration decision 420 representing "yes" if the indicator count 240 meets or exceeds the count threshold 242. In contrast, the decision module 614 can generate the alteration decision 420 representing "no" if the indicator count 240 is below the count threshold 242. The decision module 614 can send the alteration decision 420 to a replacement module 616, a notification module 618, or a combination thereof.

The content control system 100 can include the replacement module 616, which can couple to the decision module 614. The replacement module 616 generates the replacement content 334 of FIG. 3. For example, the replacement module 616 can generate the replacement content 334 based on the alteration decision 420 of "yes."

The replacement module 616 can generate the replacement content 334 in a number of ways. For example, if the alteration decision 420 is "yes," the replacement module 616 can generate the replacement content 334 based on altering the display content 202. More specifically, the replacement module 616 can generate the replacement content 334 by blocking, masking, blurring, occluding, or a combination thereof the content section 206 indicated by the filter indicator 214.

For a specific example, the replacement module 616 can generate the replacement content 334 based on the flag type 230 of FIG. 2. For example, if the flag type 230 indicates the flag indicator 226 of nudity for the content section 206, the replacement module 616 can generate the replacement content 334 having the content section 206 that has been blurred to cover the nudity. For a different example, if the flag type 230 indicates the flag indicator 226 for adult language in the content section 206, the replacement module 616 can generate the replacement content 334 having the content section 206 with the audio replaced with a "beep" sound to block the adult language. The replacement module 616 can send the replacement content 334 to a display module 620.

It has been discovered that the content control system 100 can generate the replacement content 334 based on the alteration decision 420 for improving the safety of the non-adult users viewing the display content 202. By considering the alteration decision 420, the content control system 100 can avoid under or over filtration of the display content 202 for generating the replacement content 334. As a result, efficiency for delivering the replacement content 334 can improve the safety to enhance the user experience of using the content control system 100.

The content control system 100 can include the notification module 618, which can couple to the decision module 614. The notification module 618 generates the variety of the notification type 302 of FIG. 3. For example, the notification module 618 can generate the safe zone notification 304 of FIG. 3 for notifying the upcoming display of the objected content 210.

The notification module 618 can generate the safe zone notification 304 in a number of ways. For example, the notification module 618 can generate the safe zone notification 304 with the notification type 302 of FIG. 3 of the obscenity alert 306 of FIG. 3, the permission notice 312 of FIG. 3, or a combination thereof. More specifically, the notification module 618 can generate the obscenity alert 306 based on the flag type 230 of the flag indicator 226. Moreover, the notification module 618 can generate the obscenity alert 306 to be displayed prior to displaying the content section 206 having the flag indicator 226 to forewarn the viewer of the upcoming instance of the content section 206 unsuitable for non-adult users. The notification module 618 can generate the obscenity alert 306 with the countdown time 308 of FIG. 3 to indicate how much time the viewer has before the objected content 210 will be displayed. Additionally, the notification module 618 can generate the safe zone notification 304 with the content preview 310 of FIG. 3 to disclose the content section 206 flagged with the flag indicator 226.

For a different example, the notification module 618 can generate the permission notice 312 based on the flag type 230 of the flag indicator 226. More specifically, the notification module 618 can generate the permission notice 312 to appear before the displaying of the content section 206 having the flag indicator 226 to provide opportunity for the viewer to decide whether to display the objected content 210 without filtration. The notification module 618 can generate the permission notice 312 with the filter option 314 of FIG. 3 displayed for the duration of the countdown time 308.

For further example, the notification module 618 can generate the permission notice 312 based on the content type 208. More specifically, the content type 208 can have the age group 228 of FIG. 2 for viewing the display content 202. If the user with the individual profile 410 below the age group 228 tries to access the display content 202, the notification module 618 can generate the permission notice 312 for the user to seek permission to access the display content 202. For another example, the notification module 618 can generate the content suggestion 318 of FIG. 3 to suggest the content type 208 suitable for the individual profile 410 with the age group 228.

For a different example, the notification module 618 can generate the risk range 338 of FIG. 3 based on the content start 222 and the content end 224. The notification module 618 can generate the risk range 338 to provide the duration for how long in time period that the objected content 210 will be within the display content 202. The notification module 618 can send the safe zone notification 304 to a display module 620.

The navigation system 100 can include the display module 620, which can couple to the notification module 618. The display module 620 displays the display content 202, the replacement content 334, the safe zone notification 304, or a combination thereof. For example, the display module 620 can display the display content 202 or the replacement content 334 based on the mode type 320 of FIG. 3, the view type 326 of FIG. 3, or a combination thereof.

The display module 620 can display in a number of ways. For example, the display module 620 can display the replacement content 334 based on the mode type 320 representing the kid mode 324 of FIG. 3 to block the content section 206 unsuitable for non-adults. In contrast, the display module 620 can display the objected content 210 based on the mode type 320 representing the adult mode 322 of FIG. 3 to display the display content 202 unfiltered.

More specifically, the display module 620 can display the display content 202 for the mode type 320 based on the individual profile 410. For example, the individual profile 410 can represent a user under the age of 5. The individual profile 410 can include the password for the user. If the user entry 234 represents the password for the user under the age of 5, the display module 620 can display content 202 for the kid mode 324 to filter the display content 202 unsuited for the user under age of 5.

For another example, the display module 620 can display the safe zone notification 304, the permission notice 312, the content suggestion 318, or a combination thereof based on the view type 326. The display module 620 can display the permission notice 312 on the view type 326 of the parent view 328 of FIG. 3 when the non-adult user tries to access the content type 208 not suited for the age group 228 of the individual profile 410. The adult user can make the user entry 234 on the permission notice 312 to permit the access the content type 208 for the non-adult users.

For further example, the display module 620 can display the child view 330 of FIG. 3 to view the result of whether the permission was granted via the permission notice 312. For a different example, the display module 620 can display the permission notice 312 on the child view 330. The user with the individual profile 410 within the age group 228 can attempt to access the display content 202 unsuitable for the age group 228. The display module 620 can display the permission notice 312 on the child view 330 for the non-adult to seek permission from the adult to view the display content 202.

For illustrative purposes, the content control system 100 is described with the receiver module 602 receiving the filter indicator 214, although it is understood that the receiver module 602 can operate differently. For example, the receiver module 602 can receive the replacement rating 336 of FIG. 3 for grading the replacement content 334. More specifically, the user of the content control system 100 can provide the replacement rating 336 to grade the replacement content 334 blocking the content section 206 indicated as unsuitable for non-adult user by the filter indicator 214. The replacement rating 336 can be a feedback to improve the filtration of the content section 206 for generating the replacement content 334. Further, the content control system 100 can share the replacement rating 336 to other users of the content control system 100.

For illustrative purposes, the content control system 100 is described with the pattern module 610 determining the filter pattern 236, although it is understood that the pattern module 610 can operate differently. For example, the pattern module 610 can update the filter pattern 236 based on the community model 414 of FIG. 4 of the community 408. More specifically, the filter pattern 236 provided by the individual user of the content control system 100 can update the filter pattern 236 based on the community standard 416 of FIG. 4. If the difference between the filter pattern 236 provided by the individual user is differs by meeting or exceeding the difference threshold 418 of FIG. 4, the pattern module 610 can update the filter pattern 236 provided by the individual user with the community standard 416.

The pattern module 610 can determine the difference based on the difference between the indicator count 240 of the filter pattern 236 provided by the indicator count 240 of the filter pattern 236 for the community model 414. For example, if the indicator count 240 for the filter pattern 236 provided the individual is less than the community model 414, the pattern module 610 can update the filter pattern 236 for the individual to meet the community standard 416 of the community model 414. However, the individual user can opt out of the update by refusing the update of the filter pattern 236 with the community standard 416.

It has been discovered that the content control system 100 updating the filter pattern 236 to the community standard 416 of the community model 414 improves the safety of the non-adult user viewing the display content 202. By updating the filter pattern 236 to the community model 414, the content control system 100 can generate the replacement content 334 suitable for the age group 228. As a result, the improved safety for the non-adult users can improve the user experience of the first device 102 of FIG. 1, the content control system 100, or a combination thereof.

For illustrative purposes, the content control system 100 is described with the decision module 614 generating the alteration decision 420 based on the indicator count 240, although it is understood that the decision module 614 can operate differently. For example, the decision module 614 can generate the alteration decision 420 based on the filter pattern 236 failing to meet the community standard 416. As discussed above, if the difference between the filter pattern 236 provided by the individual user is differs by meeting or exceeding the difference threshold 418, thus, failing to meet the community standard 416, the decision module 614 can generate the alteration decision 420 to update the filter pattern 236 provided by the individual user with the community standard 416.

It has been discovered that the content control system 100 can generate the alteration decision 420 based on the filter pattern 236 failing to meet the community standard 416. By making the alteration decision 420 by comparing to the community standard 416, the content control system 100 can generate the replacement content 334 for the age group 228. As a result, the improved safety for the non-adult users can improve the user experience of the first device 102, the content control system 100, or a combination thereof.

The content control system 100 can include an agreement module 622, which can couple to the receiver module 602. The agreement module 622 generates the joint agreement 332 of FIG. 3. For example, the agreement module 622 can generate the joint agreement 332 for controlling the content type 208 viewable on the first device 102. More specifically, the agreement module 622 can generate the joint agreement 332 based on the user entry 234 representing the content type 208 permissible to be viewed by the non-adult users. Furthermore, the user entry 234 can include selecting the filter level 316 of FIG. 3 to control the display of the content section 206 unsuitable for non-adult users.

The content control system 100 can include a report module 624, which can couple to the display module 620. The report module 624 generates the access report 422 of FIG. 3. For example, the report module 624 can generate the access report 422 for tracking the content type 208 accessed for viewing on the first device 102. For example, the report module 624 can generate the access report 422 based on the content type 208, the individual profile 410, or a combination thereof. More specifically, the access report 422 can include the details regarding the objected content 210 accessed by the user with the individual profile 410 who is a non-adult.

The physical transformation for generating the notification type 302 results in the movement in the physical world, such as people using the first device 102, based on the operation of the content control system 100. As the movement in the physical world occurs, the movement itself creates additional information that is converted back into display of the display content 202, the permission notice 312, or a combination thereof for the continued operation of the content control system 100 and to continue movement in the physical world.

The first software 526 of FIG. 5 of the first device 102 of FIG. 5 can include the content control system 100. For example, the first software 526 can include the receiver module 602, the filter determinator module 604, the source module 606, the content determinator module 608, the pattern module 610, the counter module 612, the decision module 614, the replacement module 616, the notification module 618, the display module 620, the agreement module 622, and the report module 624.

The first control unit 512 of FIG. 5 can execute the first software 526 for the receiver module 602 to receive the filter indicator 214. The first control unit 512 can execute the first software 526 for the filter determinator module 604 to determine the filter type 216. The first control unit 512 can execute the first software 526 for the source module 606 to identify the filter source 404. The first control unit 512 can execute the first software 526 for the content determinator module 608 to determine the content type 208.

The first control unit 512 can execute the first software 526 for the pattern module to determine the filter pattern 236. The first control unit 512 can execute the first software 526 for the counter module 612 to calculate the indicator count 240. The first control unit 512 can execute the first software 526 for the decision module 614 to generate the alteration decision 420. The first control unit 512 can execute the first software 526 for the replacement module 616 to generate the replacement content 334.

The first control unit 512 can execute the first software 526 for the notification module 618 to generate the variety of the notification type 302. The first control unit 512 can execute the first software 526 for the display module 620 to display the display content 202. The first control unit 512 can execute the first software 526 for the agreement module 622 to generate the joint agreement 332. The first control unit 512 can execute the first software 526 for the report module 624 to generate the access report 422.

The second software 542 of FIG. 5 of the second device 106 of FIG. 5 can include the content control system 100. For example, the second software 542 can include the receiver module 602, the filter determinator module 604, the source module 606, the content determinator module 608, the pattern module 610, the counter module 612, the decision module 614, the replacement module 616, the notification module 618, the display module 620, the agreement module 622, and the report module 624.

The second control unit 534 of FIG. 5 can execute the second software 542 for the receiver module 602 to receive the filter indicator 214. The second control unit 534 can execute the second software 542 for the filter determinator module 604 to determine the filter type 216. The second control unit 534 can execute the second software 542 for the source module 606 to identify the filter source 404. The second control unit 534 can execute the second software 542 for the content determinator module 608 to determine the content type 208.

The second control unit 534 can execute the second software 542 for the pattern module to determine the filter pattern 236. The second control unit 534 can execute the second software 542 for the counter module 612 to calculate the indicator count 240. The second control unit 534 can execute the second software 542 for the decision module 614 to generate the alteration decision 420. The second control unit 534 can execute the second software 542 for the replacement module 616 to generate the replacement content 334.

The second control unit 534 can execute the second software 542 for the notification module 618 to generate the variety of the notification type 302. The second control unit 534 can execute the second software 542 for the display module 620 to display the display content 202. The second control unit 534 can execute the second software 542 for the agreement module 622 to generate the joint agreement 332. The second control unit 534 can execute the second software 542 for the report module 624 to generate the access report 422.

The content control system 100 can be partitioned between the first software 526 and the second software 542. For example, the second software 542 can include the filter determinator module 604, the source module 606, the content determinator module 608, the pattern module 610, counter module 612, the decision module 614, the replacement module 616, the notification module 618, the agreement module 622, and the report module 624. The second control unit 534 can execute modules partitioned on the second software 542 as previously described.

The first software 526 can include the receiver module 602 and the display module 620. Based on the size of the first storage unit 514, the first software 526 can include additional modules of the content control system 100. The first control unit 512 can execute the modules partitioned on the first software 526 as previously described.

The first control unit 512 can operate the first communication unit 516 of FIG. 5 to send the filter indicator 214 to the second device 106. The first control unit 512 can operate the first software 526 to operate the location unit 520. The second communication unit 536 of FIG. 5 can send the replacement content 334 to the first device 102 through the communication path 104 of FIG. 5.

The content control system 100 describes the module functions or order as an example. The modules can be partitioned differently. For example, the display module 620 and the receiver module 602 can be combined. Each of the modules can operate individually and independently of the other modules. Furthermore, data generated in one module can be used by another module without being directly coupled to each other. For example, the display module 1122 can receive the replacement content 334 from the replacement module 616.

The modules described in this application can be hardware circuitry, hardware implementation, or hardware accelerators in the first control unit 512 or in the second control unit 534. The modules can also be hardware circuitry, hardware implementation, or hardware accelerators within the first device 102 or the second device 106 but outside of the first control unit 512 or the second control unit 534, respectively.

The modules described in this application can be stored in a non-transitory computer readable medium. The first storage unit 514, the second storage unit 546 of FIG. 5, or a combination thereof can represent the non-transitory computer readable medium. The first storage unit 514, the second storage unit 546, or a combination thereof or a portion thereof can be removable from the first device 102 or the second device 106. Examples of the non-transitory computer readable medium can be a non-volatile memory card or stick, an external hard disk drive, a tape cassette, or an optical disk.

Figure 7:
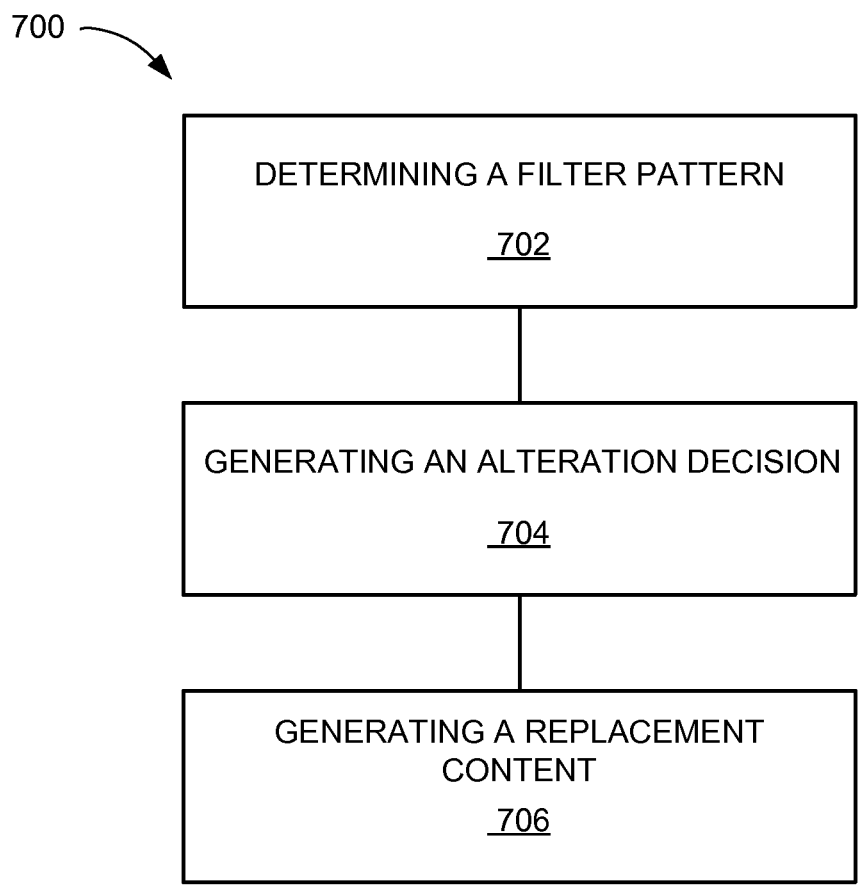
FIG. 7 is a flow chart of a method of operation of a content control system in an embodiment of the present invention.

Referring now to FIG. 7, therein is shown a flow chart of a method 700 of operation of a content control system 100 in an embodiment of the present invention. The method 700 includes: determining a filter pattern on a display content in a block 702; generating an alteration decision based on the filter pattern failing to meet a community standard in a block 704; and generating a replacement content with a control unit based on the alteration decision for displaying on a device in a block 706.

It has been discovered that the content control system 100 determining the filter pattern 236 of FIG. 2 on the display content 202 of FIG. 2 can improve the safety of the user viewing the display content 202. By determining the filter pattern 236, the content control system 100 can determine the indicator count 240 of FIG. 2 to determine the alteration decision 420 of FIG. 4. Based on the alteration decision 420, the content control system 100 can generate the replacement content 334 of FIG. 3 to filter the objected content 210 of FIG. 2 from the user unsuitable to view the display content 202. As a result, the generation of the replacement content 334 improves the safety by protecting the user from viewing the objected content 210 unsuitable for the age group 228 of FIG. 2 for enhancement of the user experience of using the content control system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A content control system comprising:
a control unit including a processor configured to:
determine a filter pattern based on an arrangement of a number of a filter indicator marked on a display content;
calculate an indicator count for the filter pattern, wherein the indicator count is a sum of the number of instances the display content is marked with the filter indicator;
update the filter pattern to meet a community standard based on the indicator count for the filter pattern of a user entry being below the indicator count for a community model, wherein the community standard is an instance of the filter pattern approved by a community of users;
generate an alteration decision based on the indicator count satisfying a count threshold and the community standard; and
generate an obscenity alert based on the alteration decision wherein the obscenity alert including a countdown time indicating a time left prior to reaching a content time where a flag type unsuitable for an age group will be displayed; and
a communication unit including a microelectronic, coupled to the control unit, configured to transmit the obscenity alert for displaying on a device.

2. The system as claimed in claim 1 wherein the control unit is configured to determine a sequence indicator based on an indicator relationship.

3. The system as claimed in claim 1 wherein the control unit is configured to generate a safe zone notification for notifying a user.

4. The system as claimed in claim 1 wherein the control unit is configured to generate the obscenity alert with the countdown time for notifying a user.

5. The system as claimed in claim 1 wherein the control unit is configured to generate a permission notice with a filter option for a duration of the countdown time.

6. The system as claimed in claim 1 wherein the control unit is configured to determine a filter type of the filter indicator.

7. The system as claimed in claim 1 wherein the control unit is configured to update the filter pattern to meet the community model based on comparing the filter pattern to the community standard.

8. The system as claimed in claim 1 wherein the control unit is configured to display a replacement content based on a kid mode for blocking a content section unsuitable for a user.

9. The system as claimed in claim 1 wherein the control unit is configured to generate a joint agreement for controlling a content type displayable on the device.

10. The system as claimed in claim 1 wherein the control unit is configured to generate an access report for tracking a content type accessed on the device.

11. A method of operation of a content control system comprising:

determining a filter pattern based on an arrangement of a number of a filter indicator marked on a display content;
calculating an indicator count for the filter pattern, wherein the indicator count is a sum of the number of instances the display content is marked with the filter indicator;
updating the filter pattern to meet a community standard based on the indicator count for the filter pattern of a user entry being below the indicator count for a community model, wherein the community standard is an instance of the filter pattern approved by a community of users;
generating an alteration decision based on the indicator count satisfying a count threshold and the community standard; and
generating an obscenity alert with a control unit based on the alteration decision wherein the obscenity alert including a countdown time indicating a time left prior to reaching a content time where a flag type unsuitable for an age group will be displayed for displaying on a device.

12. The method as claimed in claim 11 further comprising determining a sequence indicator based on an indicator relationship.

13. The method as claimed in claim 11 further comprising generating a safe zone notification for notifying a user.

14. The method as claimed in claim 11 further comprising generating the obscenity alert with the countdown time for notifying a user.

15. The method as claimed in claim 11 further comprising generating a permission notice with a filter option for a duration of the countdown time.

16. A non-transitory computer readable medium including steps executable by a control unit, the steps comprising:
determining a filter type of a filter indicator;
determining a filter pattern of the filter type based on an arrangement of a number of the filter indicator marked on a display content;
calculating an indicator count for the filter pattern, wherein the indicator count is a sum of the number of instances the display content is marked with the filter indicator;
updating the filter pattern to meet a community standard based on in the indicator count for the filter pattern of a user entry being below the indicator count for a community model, wherein the community standard is an instance of the filter pattern approved by a community of users;
generating an alteration decision based on the indicator count satisfying a count threshold and the community standard; and
generating an obscenity alert with a control unit based on the alteration decision wherein the obscenity alert including a countdown time indicating a time left prior to reaching a content time where a flag type unsuitable for an age group will be displayed for displaying on a device.

17. The non-transitory computer readable medium as claimed in claim 16, wherein the steps include updating the filter pattern to meet the community model based on comparing the filter pattern to the community standard.

18. The non-transitory computer readable medium as claimed in claim 16, wherein the steps include displaying a replacement content based on a kid mode for blocking a content section unsuitable for a user.

19. The non-transitory computer readable medium as claimed in claim 16, wherein the steps include generating a joint agreement for controlling a content type displayable on the device.

20. The non-transitory computer readable medium as claimed in claim 16, wherein the steps include generating an access report for tracking a content type accessed on the device.

* * * * *